United States Patent [19]

Yamauchi et al.

[11] Patent Number: 5,692,474
[45] Date of Patent: Dec. 2, 1997

[54] ENGINE COMBUSTION CONTROL APPARATUS

[75] Inventors: Teruo Yamauchi, Hitachinaka; Takao Sasayama, Hitachi; Sadayasu Ueno, Hitachinaka, all of Japan

[73] Assignee: Hitachi, Ltd., Tokyo, Japan

[21] Appl. No.: 724,897

[22] Filed: Oct. 3, 1996

[30] Foreign Application Priority Data

Oct. 3, 1995 [JP] Japan ................................ 7-256444

[51] Int. Cl.$^6$ ................................ F02P 5/14
[52] U.S. Cl. ................................ 123/425
[58] Field of Search ................ 123/425, 698; 364/431.08; 73/117.3

[56] References Cited

U.S. PATENT DOCUMENTS

| | | | |
|---|---|---|---|
| 5,268,843 | 12/1993 | Imai | 364/431.08 |
| 5,386,367 | 1/1995 | Ziegler et al. | 364/431.08 |
| 5,411,000 | 5/1995 | Miyashita et al. | 123/425 |
| 5,535,722 | 7/1996 | Graessley et al. | 123/425 |
| 5,546,905 | 8/1996 | Fukui | 123/425 |

*Primary Examiner*—Raymond A. Nelli
*Attorney, Agent, or Firm*—Evenson, McKeown, Edwards & Lenahan, P.L.L.C.

[57] ABSTRACT

An engine combustion control apparatus includes a pressure sensor provided at each of the cylinders in an engine, for detecting the pressure in each cylinder, and a controller for calculating the state variables of the intake amount and combustion temperature in each cylinder, based on the detected pressure values, and for controlling the operational variables such as the fuel amount to be injected, fuel injection timing, and so forth, based on the calculated state variables.

9 Claims, 13 Drawing Sheets

$P_{t1} \sim P_{t5}$: FUEL INJECTION PULSE WIDTH

TDC: TOP DEATH CENTER

| | OPENING TIMING | CLOSING TIMING |
|---|---|---|
| INTAKE VALVE | 20° BTDC | 48° ABDC |
| EXHAUST VALVE | 60° BBDC | 8° ATDC |

TDC : TOP DEATH CENTER, BDC : BOTTOM DEATH CENTER
BTDC : BEFORE TDC, ATDC : AFTER TDC
BBDC : BEFORE BDC, ABDC : AFTER BDC

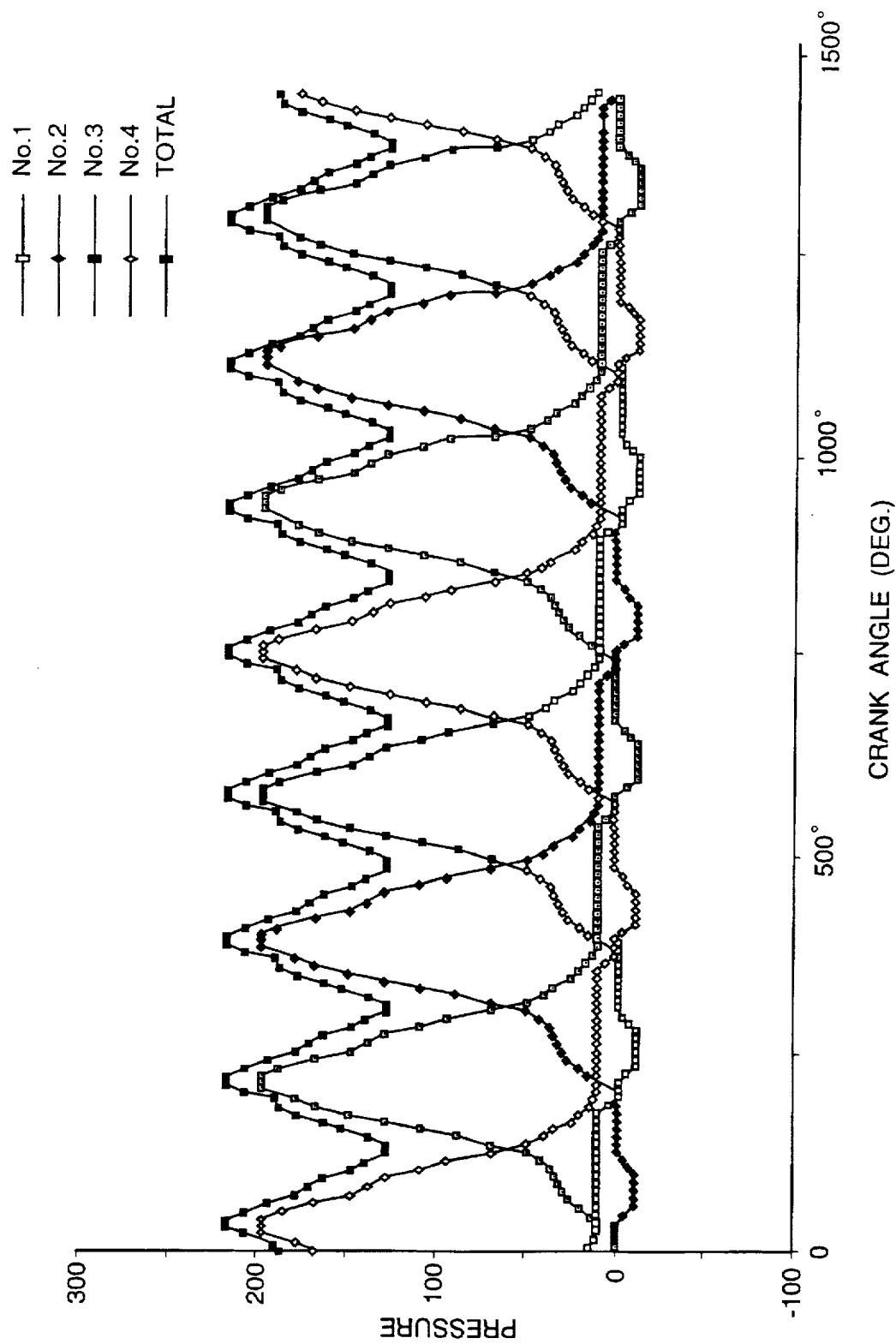

ENGINE COMBUSTION CONTROL APPARATUS

BACKGROUND OF THE INVENTION

1. Field of the Invention

The present invention relates to an internal combustion engine, particularly to an engine combustion control apparatus for a vehicle wherein cleaning exhaust gas, and fuel consumption, are improved, by detecting pressure in cylinders and optimally controlling quantities relating to engine combustion, such as fuel amount to be injected, ignition time, exhaust gas recirculation amount, and so forth, based on the detected pressure in each cylinder of the engine.

2. Description of Related Art

For an internal-combustion engine, especially an engine burning gasoline, highly accurate fuel feeding control is required from the view points of cleaning-up exhaust gas and energy saving.

For the requirement, it has been popular to control an air fuel ratio by accurately detecting an air intake amount and determining a necessary fuel amount to be injected, based on the detected air intake amount.

However, because the air intake amount depends on the volume of an intake pipe and the compression extent of the air, the amount only can be estimated. Existing techniques for controlling the air fuel ratio therefore have room for improvement in accuracy.

Further, recently, it has been strongly desired to more accurately control the engine combustion, for responding to reinforcement of the exhaust gas regulation and the requirement for saving resources, especially for responding by taking countermeasures for cleaning up HC (unburned hydrocarbon) and $NO_x$ (nitrogen oxide) which are very difficult to clean up in exhaust gas and are ringleaders in the environmental disruption of the earth.

For cleaning up HC and $NO_x$ generated in an engine, the following methods have been adopted: a method for cleaning up both substances HC and $NO_x$ using a rhodium catalytic converter provided in an exhaust pipe; a method for cleaning up HC by increasing the temperature of the exhaust gas and promoting oxidation of HC; a method for cleaning up nasty $NO_x$ by suppressing combustion with an exhaust gas recirculation unit so that the combustion temperature of the nitrogen gas in the cylinders does not reach the thermal dissociation temperature of the nitrogen gas; and so forth.

However, in the above-mentioned existing exhaust gas cleaning-up methods, because indirect detection methods of engine combustion state variables are adopted for controlling the engine combustion, cleaning-up exhaust gas, and fuel consumption, have not been sufficiently improved.

The above-mentioned existing techniques are based on indirect sensing methods, and do not accurately realize the engine combustion control corresponding to operational states of an engine. Thus, those existing techniques do not have sufficient accuracy for the engine combustion control.

Furthermore, it will be required to more severely reduce the large amount of HC generated during the engine starting period (within about 2 minutes from starting the engine). For example, in Japan, an exhaust gas regulation of reducing the amount of HC generated in an engine into a level of less than 10% of the present level of HC, will be put in force. Although highly accurate engine combustion control is needed for complying with such a regulation, the existing techniques can not sufficiently solve the above-mentioned problem.

SUMMARY OF THE INVENTION

An Objective of the Invention

An object of the present invention is to provide an engine combustion control apparatus with which it is possible under any assumed operational situation of an internal combustion engine, to improve fuel consumption and performance of exhaust gas cleaning-up, in the engine, by detecting operational states of the engine, based on pressure detected in each cylinder of the engine, and consequently to suppress global environment pollution and to postpone the exhaustion of fossil fuel.

Methods Solving the Problem

The above-mentioned objective is achieved by providing an apparatus for detecting the peak combustion pressure and a crank angle at the time that the peak occurs, in real time, and controlling an air fuel ratio in each cylinder of an internal-combustion engine based on information of the combustion pressure detected in time series, in each cylinder. This is done so that the peak combustion pressure occurs in the range of a crank angle, of 10 deg.–15 deg. after the compression top dead center of the crank angle, and the peak combustion pressure is as high as possible in an operation cycle of each cylinder.

Further, the above-mentioned apparatus includes means for estimating combustion states of each cylinder by using a waveform of the combustion pressure detected in time series in each cylinder, as well as a time-integrated value and a time derivative value of the waveform.

Furthermore, in the above mentioned apparatus, the air fuel ratio and the ignition timing are controlled so that the optimal combustion operation is maintained for any operational state of the engine by estimating operation loads of the engine, based on the detected combustion pressure and the detected opening of a throttle valve, of each cylinder.

By using the engine combustion control apparatus, because the ignition timing is controlled so that the peak of combustion pressure occurs in the range of the crank angle, of 10–15 deg. after the compression top dead center of the crank angle, where the engine outputs the maximum power, it is possible to keep operating the engine at the operational point of maximum power output. This, remarkably, improves the clean-up of exhaust gas and the fuel consumption.

Furthermore, because it is possible to optimally control the fuel amount to be injected and the ignition timing, for each cylinder, by directly detecting combustion pressure in each cylinder of the engine and analyzing factors relating to the engine combustion in real-time and further to accurately control factors relating to the fuel consumption and the exhaustion of toxic gas, such as the air fuel ratio, the ignition timing, the exhaust gas recirculation amount, and so forth, the invention is also effective for the global environmental preservation.

Thus, the engine combustion control apparatus of the present invention can sufficiently comply with even the severe exhaust gas regulations which will be put in force, i.e. that of reducing the generated HC into a level of less than 10% of the present level of the much generated HC.

BRIEF DESCRIPTION OF THE DRAWINGS

FIG. 16 are graphs showing pressure changes detected by the pressure sensors provided at the cylinders of the embodiment.

DETAILED DESCRIPTION OF THE EMBODIMENTS

Figure 1:
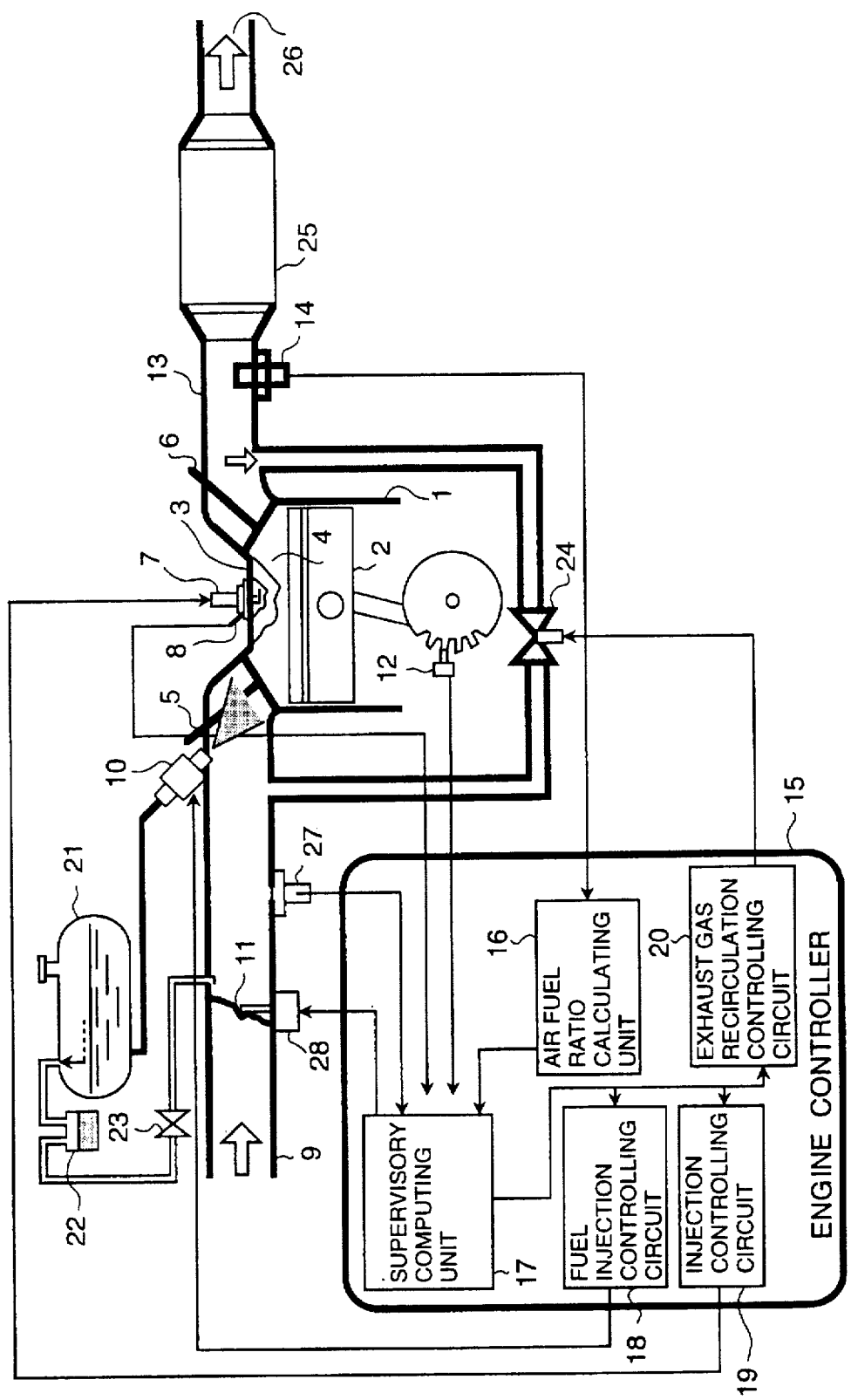
FIG. 1 is a block diagram showing a composition of an engine combustion control apparatus of an embodiment in the present invention.

Hereinafter, details of the present invention will be explained with reference to embodiments shown in the drawings.

FIG. 1 is a block diagram showing the composition of an engine combustion control apparatus of an embodiment in the present invention. In the figure, numeral 1 indicates an engine having combustion chambers 4, each of the combustion chambers 4 being composed of a piston 2 and a cylinder 3, at which an intake valve 5 and an exhaust valve 6 are installed. An air-fuel mixture led into the combustion chamber 4 is ignited by an ignition plug 7.

A pressure sensor 8 is provided in each of the cylinders 3. Therefore, for a multi-cylinder engine, the number of pressure sensors 8 is equal to the number of cylinders A fuel injection valve 10 for weighing or metering a fuel amount to be injected, and injecting said fuel, is provided at the vicinity of the intake valve in each intake pipe. Fuel is injected into each cylinder at the optimal timing via the valve 10.

The intake air amount for each cylinder is controlled by throttle valve 11. The opening of the throttle valve 11 is controlled by rotating a motor 28, corresponding to an actuating amount of an acceleration pedal (not shown in the figures) calculated based on operational information input to an engine controller 15.

At the throttle valve 11 for each cylinder, a valve angle sensor for detecting the opening of the throttle valve 11 is provided, and a signal output from each valve angle sensor is input to the controller 15, and is used to estimate an operational load required for the engine 1.

A crank angle sensor 12 for each cylinder is provided at a crank shaft of the engine 1, and a signal output from each crank angle sensor 12 is input to the controller 15 for calculating engine speed.

Further, signals output from the pressure sensor 8 and an oxygen density sensor, in each cylinder, are also input to the controller 15 for calculating the air fuel ratio with an air fuel calculation unit 16. A supervisory computing unit including a microcomputer, sends optimal operational commands, based on the calculated air fuel ratio, to a fuel injection controlling circuit 18, an ignition controlling circuit 19, and an EGR controlling circuit 20, respectively.

A canister 22 is provided next to a fuel tank 21 for absorbing fuel vapor temporarily generated in a fuel tank 21. A pipe extending from the canister 22 is connected to each intake pipe 9 at the downstream side of the throttle valve 11 via a valve 23 for controlling the evaporating amount of fuel in the fuel tank 21. Through the connected pipe, the fuel absorbed in the canister 22 flows into each intake pipe 9, of which an amount depends on the operational states of the engine 1.

Exhaust gas ejected from the engine 1 is exhausted to the atmosphere via a catalyst unit 25 provided in an exhaust pipe 13. Part of the exhaust gas is recirculated to the intake pipe 9 by the operation of an EGR valve 24 which is controlled by the controller 15. The EGR valve 24 is a feed-back flow pipe connected between the exhaust pipe 13 and the intake pipe 9. Due to the non-combustible gas mixing effect of the recirculated exhaust gas, the combustion temperature in each of the cylinders 3 is decreased, and the exhausted $NO_x$ is consequently reduced.

Further, an intake pressure sensor 27 is provided at the downstream side of the throttle valve 11 of each intake pipe 9, and a signal output from each intake pressure sensor 27 is input to the controller 15, and is used to correct the signal from the pressure sensor 8 in each cylinder 3, corresponding to the predetermined operational states.

In the following, the operations of the embodiment are explained.

Figure 2A:
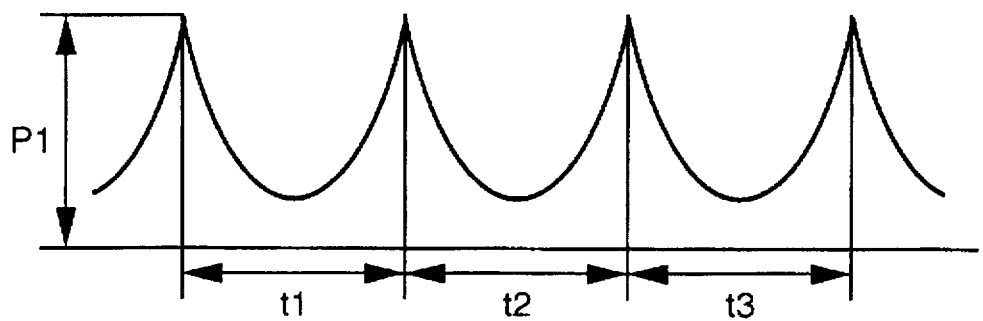
FIG. 2A is an example of a graph showing pressure changes in a cylinder of an engine at steady state operations.
Figure 2B:
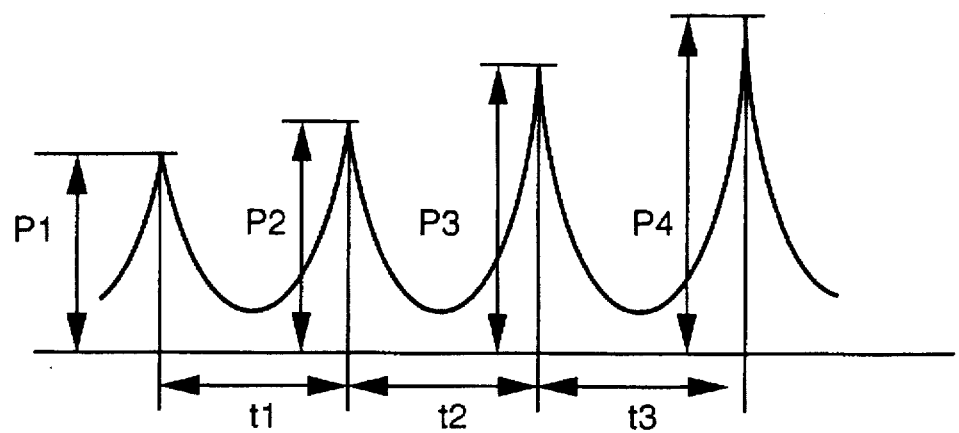
FIG. 2B is an example of a graph showing pressure changes in a cylinder of an engine at transient state operations.

FIG. 2A and FIG. 2B show examples of graphs showing pressure changes in a cylinder of an engine, at steady state operations and at transient state operations, respectively.

In the figures, each of P1–P4 indicates the combustion peak pressure, and each of t1–t3 indicates a combustion cycle period.

As seen in FIGS. 2A and 2B, generally, the waveform of the pressure changes for a combustion cycle of crank angle changes has a conic shape having a pulse shaped peak which periodically appears in time series. Although the peak value of P1–P4 is the same at the steady state operations (FIG. 2A), the peak value varies at the transient state operations (FIG. 2B).

Figure 3:
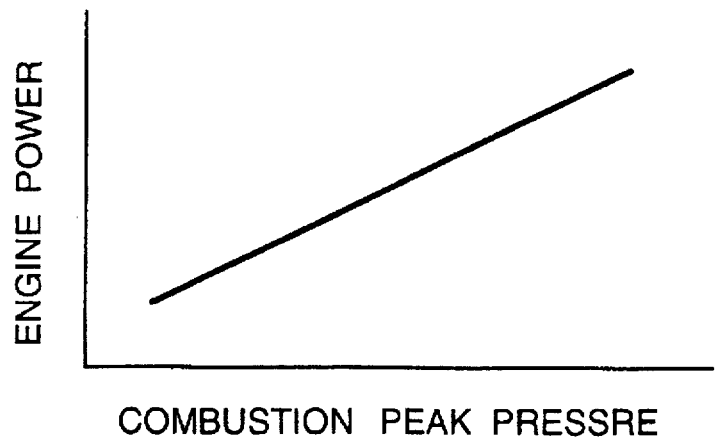
FIG. 3 is a characteristic curve showing a relation between engine power and combustion peak pressure.

Further, cylinder power is generally proportional to the combustion peak pressure, as shown in FIG. 3.

Therefore, in the embodiment, the cylinder power is estimated from the detected combustion peak pressure, and the fuel amount to be injected, is controlled, based on the estimated cylinder power.

Figure 4:
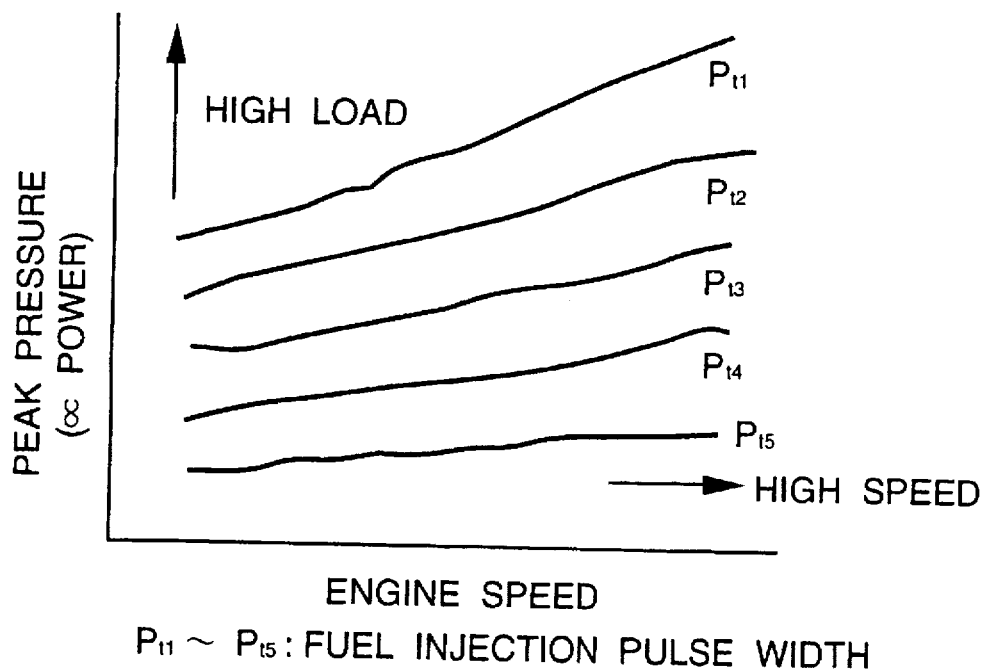
FIG. 4 is an example of data stored in a ROM, of the relationships among engine speed, combustion peak pressure and fuel injection pulse width, expressed with contour lines of the fuel injection pulse width, in an engine speed-combustion peak pressure plane.

For controlling the fuel amount to be injected, a relationship among a control parameter of a fuel injection pulse width corresponding to the fuel amount to be injected, and the peak pressure and the engine speed, is expressed with contours of the fuel injection pulse width, in engine speed-peak pressure plane, as shown in FIG. 4. The map data of the above-mentioned relationship are stored in the supervisory computing unit 17. In control processing of the engine 1, the fuel amount to be injected is determined by reading out from the stored map data the control parameter corresponding to the peak pressure detected by the pressure sensor 8 in each cylinder 3.

As expressed in FIG. 4, the read-out control parameter determining the fuel amount to be injected is a pulse width ranging within $Pt_1$–$Pt_5$, of a control pulse signal sent to each fuel injection valve 10, and output to the fuel injection controlling circuit 18 from the supervisory computing unit 17.

Furthermore, it is possible to correct the pressure sensor in each cylinder, by comparing a value of the cylinder power obtained, based on the relation shown in FIG. 3, with a value of the cylinder power estimated by using the pressure detected in the intake pipe and the detected engine speed, and adjusting the pressure sensor in the cylinder so that both the values of the cylinder power agree.

Figure 5:
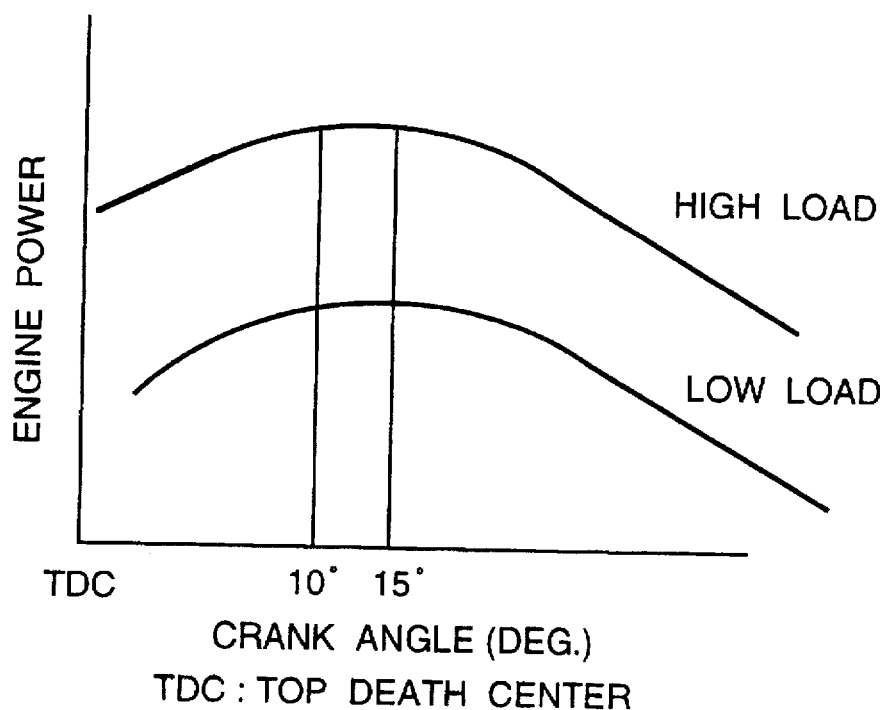
FIG. 5 shows characteristic curves of the relationship between cylinder power and the crank angle.

The crank angle at which the peak combustion pressure occurs, depends on the combustion states in the cylinder. As shown in FIG. 5, when the peak combustion pressure occurs in the range of a crank angle between 10 deg. and 15 deg. after TDC (Top Dead Center), the cylinder power becomes largest.

Therefore, in the embodiment, the engine controller 15 is composed so that the optimal combustion in the engine 1 is kept at any operational states of the engine 1, by setting such a fuel amount to be injected, fuel injection timing, and ignition timing, so that the peak of the combustion pressure occurs in the range of a crank angle between 10 deg. and 15 deg. after TDC.

Thus, in the embodiment, the combustion of the engine 1 is always controlled at the most efficient state, which greatly improves the cleaning-up of exhaust gas and the fuel consumption.

In the following another embodiment of the present invention is explained.

The amount of HC (hydrocarbon) exhausted from an engine is large, especially at the engine starting period. It is said that fuel adhering to an inside surface of a cylinder is scraped-off by a piston ring, and ejected to an exhaust pipe at the engine starting time, hence causing the large amount of exhaust HC at the engine starting time.

However, it was found that the large amount of exhaust HC is also generated, in a case where a piston of each cylinder was stopping at a specific position, right before the engine start. Therefore, in the present invention, an engine combustion control apparatus which can solve the problem of heavy exhaust HC in the above-mentioned case, is devised.

Figure 6A:
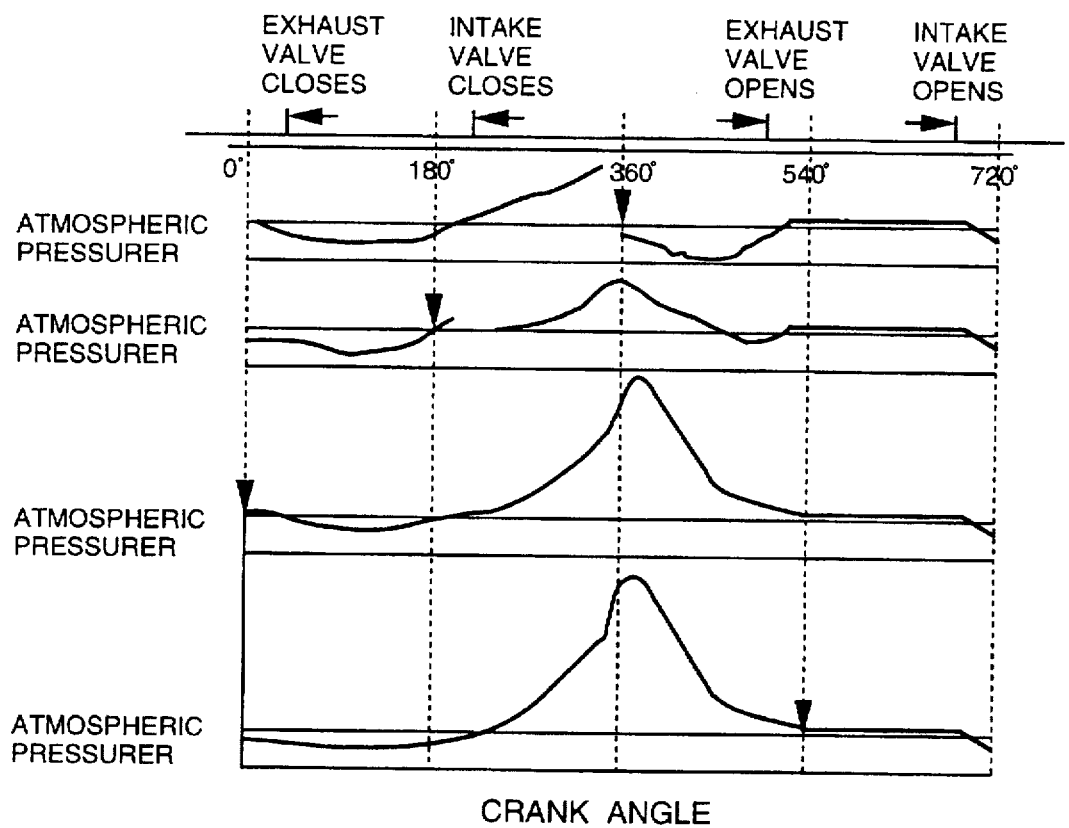
FIG. 6A are graphs showing pressure changes in each cylinder of a four-cylinder engine at the engine starting time, in the case where a piston of each cylinder has stopped at the top dead center of a piston stroke.
Figure 6B:
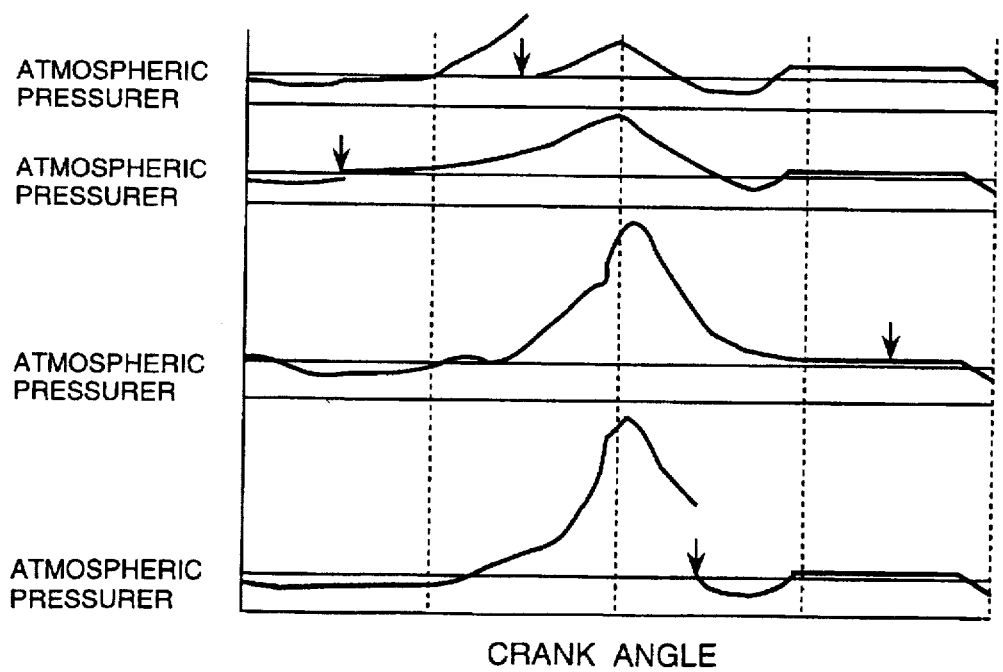
FIG. 6B are graphs showing pressure changes in each cylinder of a four-cylinder engine at the engine starting time, in the case where a piston of each cylinder has stopped at an intermediate position of a piston stroke.

FIG. 6A and FIG. 6B shows graphs of pressure changes in each cylinder of a serial four cylinder engine at the engine starting time, for the case where a piston of each cylinder was stopping at the dead center of the piston stroke, and the case where a piston of each cylinder was stopping at an intermediate position of the piston stroke, respectively. In each of the figures, the pressure in each of the No. 1–No. 4 cylinders is shown in order from the top to the bottom of the figure, and each of the downward pointing arrow marks indicates the position at which a piston of each cylinder was stopping, right before the engine start time.

In the situation shown in FIG. 6A, after an ignition switch is set to the position of engine starting, and engine cranking is started, primarily, the No. 1 piston begins to move downward from the TDC in an explosion stroke, and the No. 2 piston begins to move upward from the BDC (the Bottom Dead Center) in a compression stroke. Further, primarily, the No. 3 piston also begins to move downward from the TDC in an intake stroke, and the No. 4 piston also begins to move upward from the BDC in an exhaustion stroke.

Figure 7:
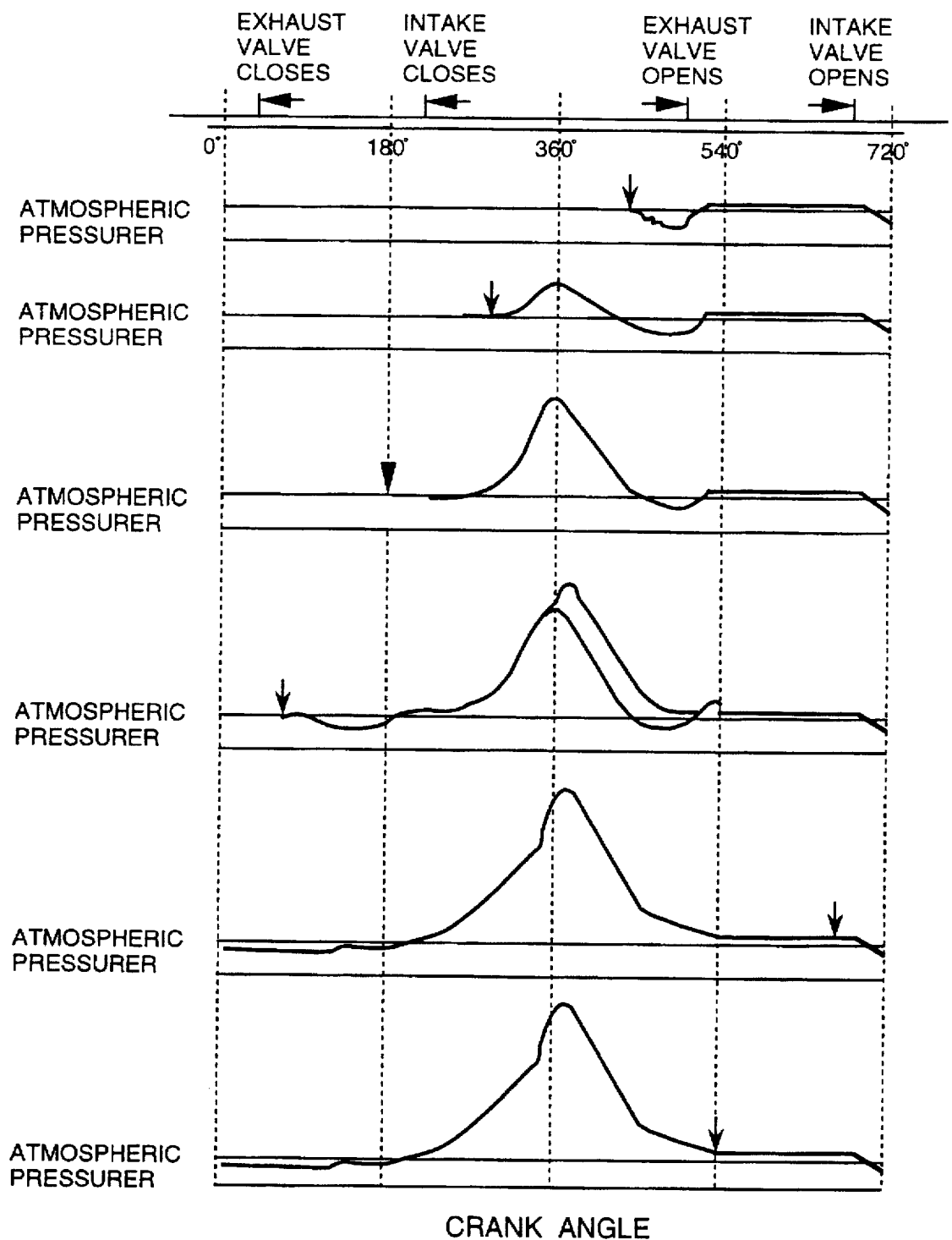
FIG. 7 are graphs showing pressure changes in each cylinder of a six-cylinder engine at the engine starting time.

Thus, in a multi-cylinder engine, all cylinders do not simultaneously begin to start the exhaustion stroke at the engine starting time, rather each cylinder starts a different stroke. The same can be said for the situations shown in FIG. 6B, and FIG. 7 showing pressure changes in each cylinder of a six-cylinder engine (120 deg. cranking angle), and the position at which each piston was stopping before the engine starting time.

Therefore, at the engine starting time, although fuel is fed to each cylinder, it occasionally occurs that fuel is not completely fed to some of the cylinders, due to the different starting positions of their pistons, which causing largely non-uniform fuel consumption among the cylinders and consequently much unburned HC.

Further, the largely non-uniform fuel consumption in this stroke affects the fuel consumption in the next stroke, which makes the fuel consumption largely deviate from the predetermined value, consequently causes also the non-uniform combustion and ejection of much unburned HC.

In fact, it is confirmed by experiments that irregular combustion occurs in cylinders at least during the period of one revolution of a crank shaft (equivalent in two cylinders for a four-cylinder engine, and three cylinders for a six-cylinder engine), after the engine starting time. Therefore, in the present invention, a method of preventing the nonuniform combustion among the cylinders, at the engine starting time, is devised as follows.

① Fuel is not fed until the pressure in each cylinder reaches the prescribed value after the engine starting time. That is, fuel feeding is begun from the intake stroke after one revolution of the cranking shaft, for a four-cylinder engine.

② It is determined at the ignition key switching-on time, which cylinder first proceeds in the intake stroke, and feeding fuel is begun from the cylinder first proceeding in the intake stroke.

③ The piston position of each cylinder is memorized by sensing each crank angle, and a cylinder into which fuel is first injected, is selected based on the memorized piston position of each cylinder.

In an embodiment to be explained in the following, the method ① is adopted, and the engine controller 15 shown in FIG. 1, includes function of a pressure signal being taken in from the pressure sensor 8 in each cylinder 3, and fuel feeding is started from a cylinder in which the pressure exceeds the reference pressure Pa in a cylinder, memorized in advance in the supervisory computing unit 17 of the controller 15.

In the embodiment, because the air fuel ratio in each cylinder is remarkably improved, the ejected amount of hydrocarbon HC is considerably reduced.

Figure 8:
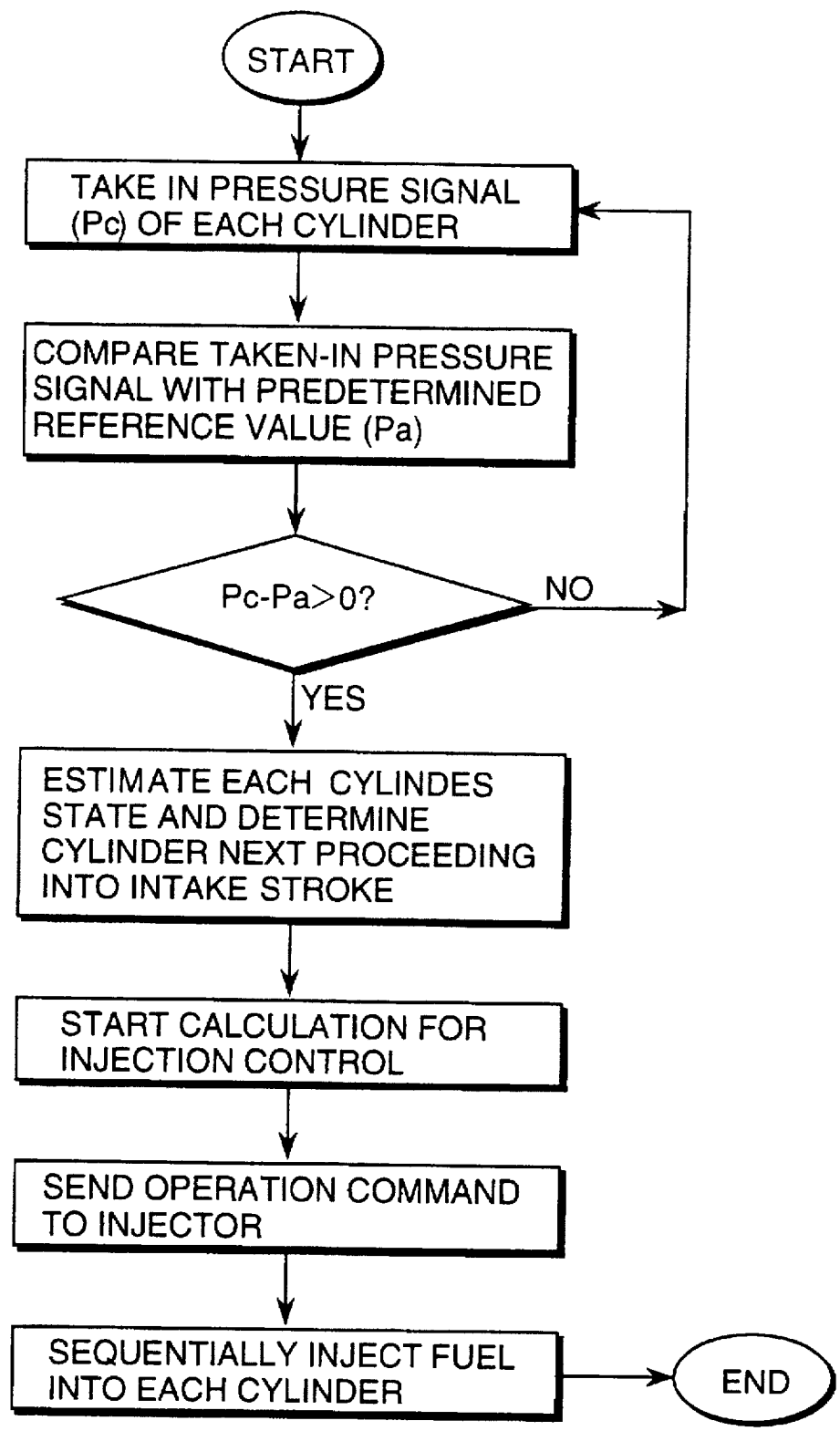
FIG. 8 is a flow chart for explaining control operations at the engine starting time, in the embodiment.
Figure 9:
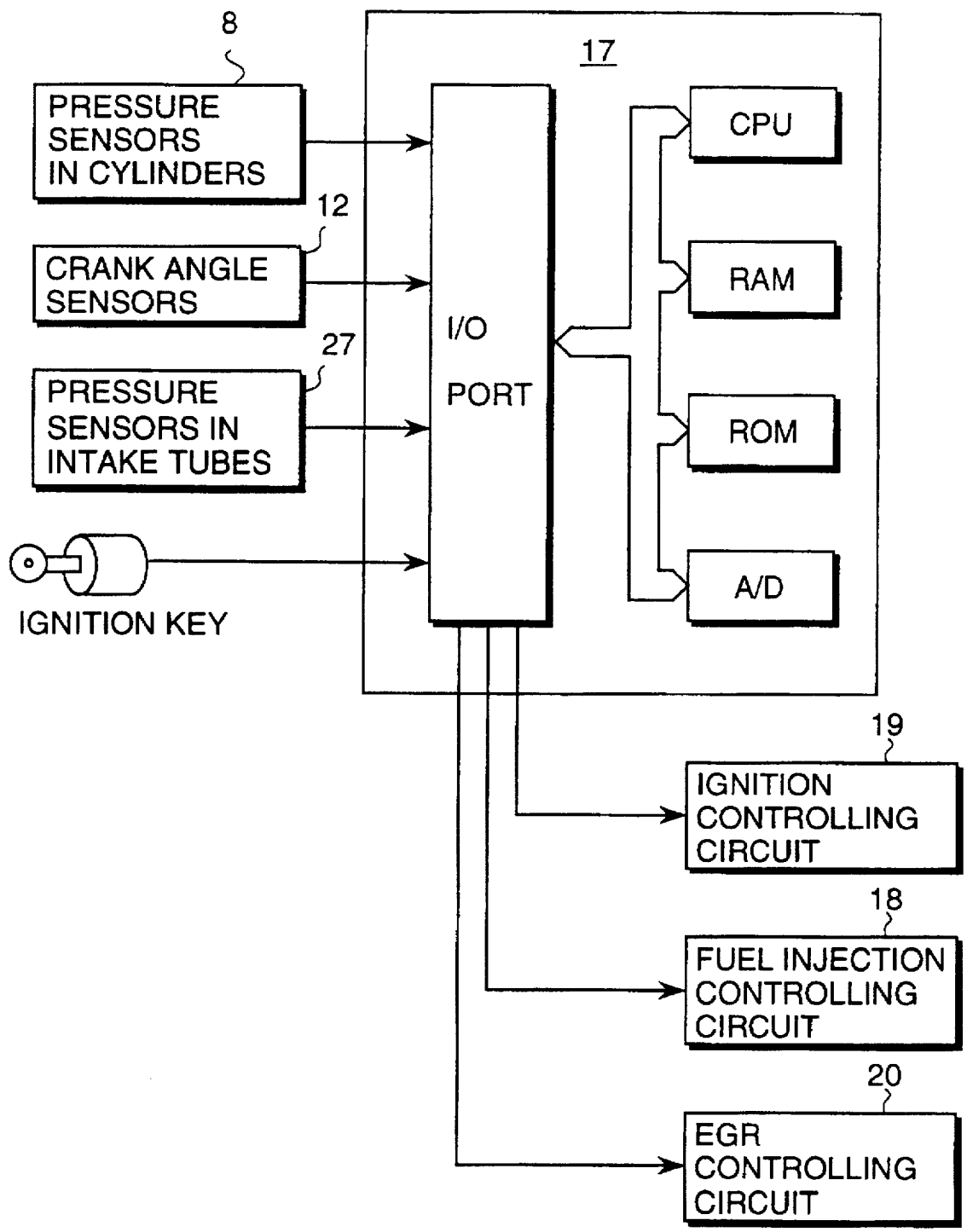
FIG. 9 is a block diagram showing a composition of an engine controller of the embodiment.

FIG. 8 is a flow chart showing operations of the control apparatus of the embodiment. Processing shown in the flow chart is programmed and stored in a ROM of the supervisory computing unit 17. The program is executed by a CPU in the supervisory computing unit 17 after the ignition switch is switched on. In FIG. 9, the detailed composition of the supervisory computing unit 17 is shown.

When the processing shown in FIG. 8 is started, at first, the pressure signal Pc in each cylinder is taken in via an I/O port, and the pressure signal Pc is compared with the predetermined reference pressure Pa to determine whether Pc−Pa>0. If Pc≦Pa, the process of taking-in the pressure signal Pc is repeated.

If Pc>Pa, the process continues by estimating the operational states of each cylinder, and determining and selecting a cylinder to first proceed in the intake stroke based on signals of the crank angle for each cylinder. Further, the time width Pt of the fuel injection pulse is calculated, according to the intake timing of the selected cylinder, and a fuel injection command is output to the fuel injecting circuit 18.

Thereafter, the process returns to the usual fuel injection control, and the fuel is sequentially injected into each of the cylinders 3.

Control processing executed by the supervisory computing unit 17 shown in FIG. 9, is explained as follows.

The CPU receives signals from the pressure sensors 8 in the cylinders, the crank angle sensors 12, and the ignition key switch, via the I/O port.

That is, at first, for each cylinder, the actual intake amount for each cylinder is calculated based on values obtained by integrating the difference between the pressure in the intake pipe and the pressure in the cylinder, and the opening area of the intake valve, for the time period of the opening of the intake valve. Details of the process of the actual intake amount for each cylinder will be explained later.

Next, an optimal air fuel ratio is calculated, based on the obtained actual intake amount for each cylinder and a fuel amount to be injected into the cylinder necessary to the calculated optimal air fuel ratio, is determined.

Further, a valve opening command is output to the fuel injection controlling circuit 18, and an ignition command is also output to the ignition controlling circuit 19. By the above-mentioned processing, at the engine starting time, the optimal combustion is maintained, and quality degradation of the exhaust gas is prevented. This improves combustion performance of the engine at the engine starting time.

In the following, another embodiment is explained.

Figures 10A, 10B:
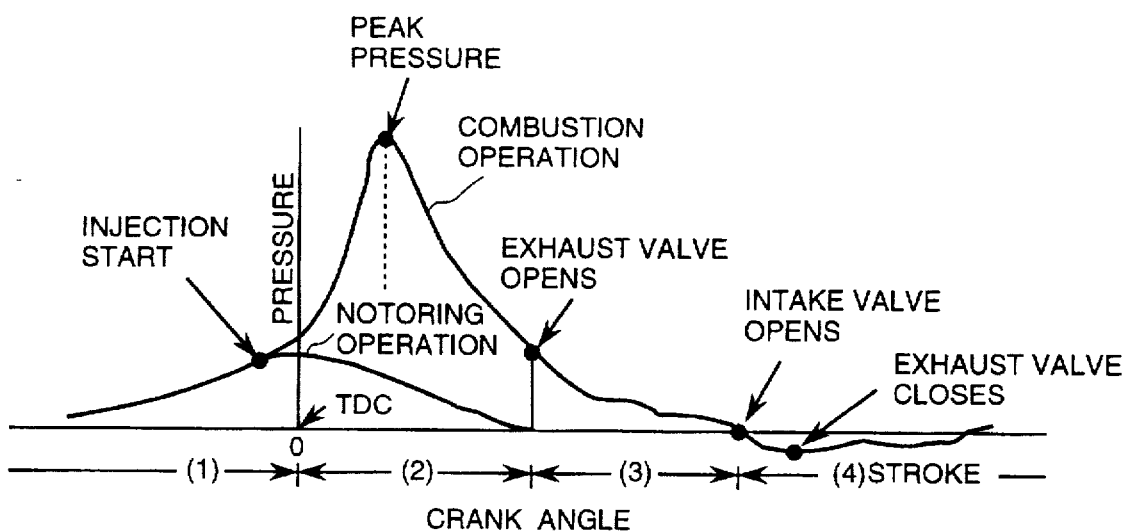
FIG. 10A shows an example of a graph showing combustion pressure changes at different operation states of the embodiment.
FIG. 10B illustrates the opening and closing timings for an intake valve and an exhaust valve, respectively.

As for a four-cycle engine, the pressure in each cylinder changes in each stroke of compression, explosion, exhaustion and intake, during one cycle operation of the engine. Generally, a graph of pressure changes to crank angle changes, shows a conic waveform with a pulse shaped peak as shown in FIG. 10A, and the peak appears after TDC successive to the compression stroke in the combustion operations of the engine. On the other hand, in the motoring operations of the engine, the pressure changes show a conical waveform without a pulse shaped peak as shown in FIG. 10A, and the waveform is symmetrical before and after TDC.

The figure clearly suggests that the following items can be available by detecting the pressure in each cylinder at each of the operational strokes.

(1) In the compression stroke:

This stroke is the period after the closing of an intake valve, the filled-up air amount in each cylinder can be calculated by detecting pressure values at any two time points.

(2) In the explosion stroke:

At first, the rate of heat generation can be calculated by using the gradient of pressure increase before the pressure peak, and the amount of burned fuel, can also be obtained based on the calculated rate of heat generation.

Next, the maximum temperature of fuel burning can be calculated by using the pressure peak value detected in each cylinder.

Further, it is known that the value obtained by integrating the pressure waveform within a specific interval in the crank angle, relates to the cylinder power and torque.

(3) In the exhaustion stroke:

The temperature of the exhaust gas can be estimated by using the pressure in this stroke.

(4) In the intake stroke:

The EGR amount and the intake air amount can be calculated by using the pressure in an intake pipe, etc..

As mentioned above, by using the detected pressure in each cylinder, various kinds of information relating to the combustion in an engine can be obtained by processing the detected pressure in each cylinder together with other state variables usually detected in an existing engine combustion control apparatus. Thus, in the present invention, it is possible to more efficiently control the engine combustion.

In the following, another embodiment is explained. In this embodiment, the intake air amount Ga is calculated by Equation (1).

$$Ga = \frac{(Vb - P6) \times P6 - \left(Vb - \frac{(k-1)}{k} \times V6\right) \times (P6 - P7)}{R \times Ta} - Gf \quad (1)$$

where Vb: a volume of a cylinder at the BDC in the intake stroke;

V6: a volume of a cylinder at the opening period of an intake valve;

P6: pressure at the opening period of an intake valve;

P7: pressure at the closing period of an intake valve;

Gf: an injected fuel amount;

R: the gas constant;

κ: the ratio of specific heat; and

Ta: atmosphere temperature.

In Equation (1), Vb, V6, κ, R and Ta are the known parameters of constants or characteristic parameters of the engine, which can be easily calculated by using the information from the various sensors installed in the engine. Therefore, the actual intake air amount can be easily obtained by inputting the pressure values P6 and P7 detected by the pressure sensor 8 in each cylinder into the supervisory computing unit 17 of the engine controller 15.

That is, because the opening and closing timings, of the intake valve 5 and the exhaust valve 6, and the positions of the piston 2 at the timings, are parameters peculiar to the engine and fixed for the type of engine, and correctly obtained based on the crank angle detected by the crank angle sensor 12, the intake air amount in each cylinder can be instantly calculated, in real time, by using the pressure signal at each specific crank angle, output from the pressure sensor 8 in each cylinder, as shown in FIG. 10B.

Figure 11:
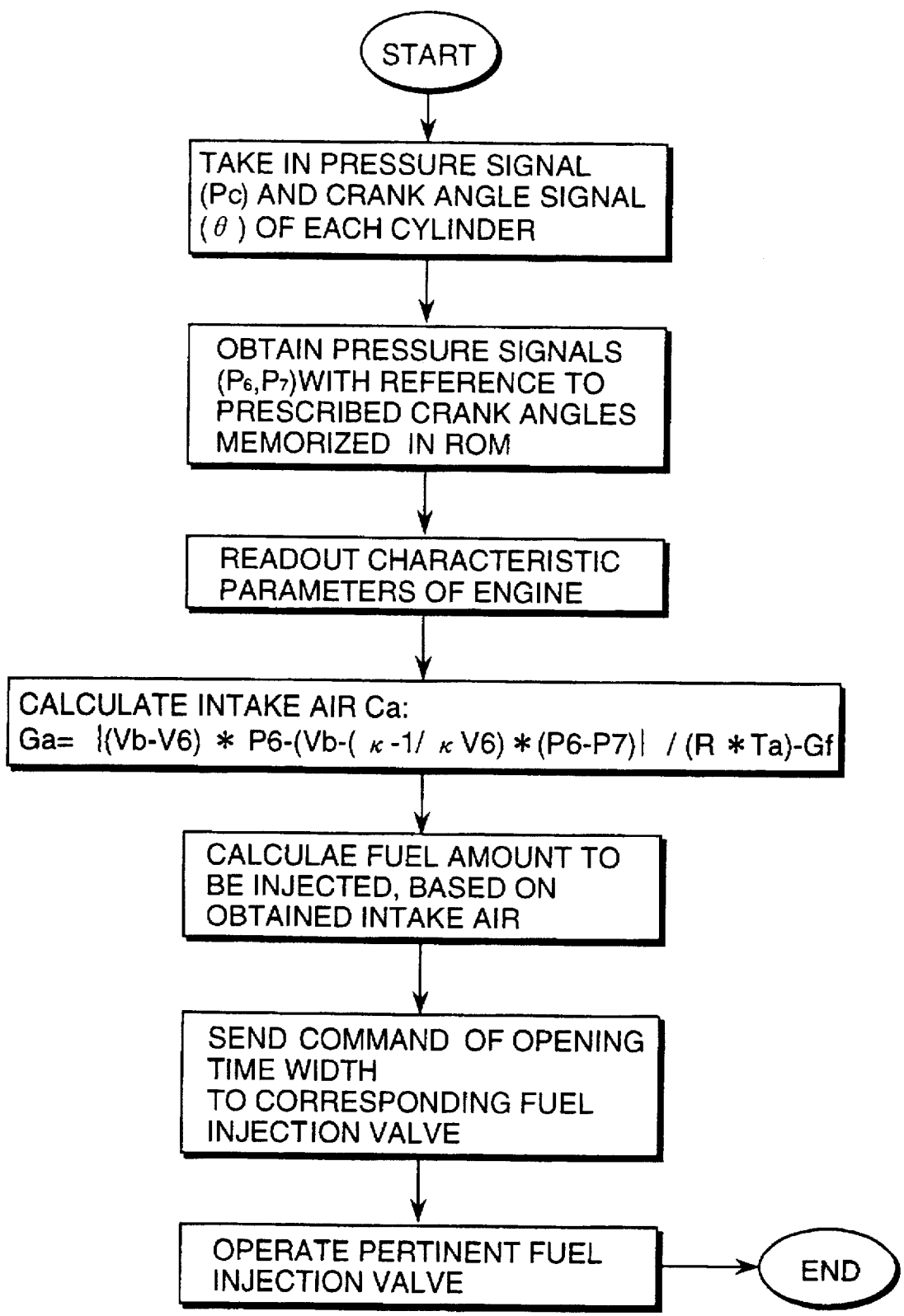
FIG. 11 is a flow chart for explaining the calculation of an air intake amount, in the embodiment.

FIG. 11 is a flow chart for explaining the process for detecting the intake air amount, which is executed by the CPU of the supervisory computing unit 17 shown in FIG. 9, with a program stored in the ROM. In the following, the process for detecting the intake air amount is explained with reference to FIG. 11.

At first, the pressure signal is received from the pressure sensor 8 in each cylinder, in the predetermined sampling interval of the crank angle sensed by the crank angle sensor 12 for each cylinder, and stored in a RAM. Next, the pressure values P6 and P7 are obtained by searching the pressure values stored in the RAM, corresponding to the specific crank angles stored in the ROM.

Further, the CPU obtains the data of Vb, V6, κ, R and Ta by using the constants and the parameters peculiar to the engine, read out from the ROM, and calculates the intake air amount Gf in each cylinder, by using Equation (1), with the data of Vb, V6, κ, R and Ta, and the already obtained P6 and P7.

Finally, the CPU calculates the fuel amount to be injected, namely, the time width Pt of the fuel injection pulse, by using the obtained intake air amount Gf. The CPU sends the fuel injection command to the fuel injection controlling circuit 18, synchronized to the intake timing of each cylinder. Consequently, the fuel injection controlling circuit 18 controls the fuel injection valve of the pertinent cylinder.

FIG. 10B is an example of the valve opening and closing timings for a widespread vehicle gasoline engine, shown in the crank angle.

The valve opening and closing timings depend on a profile of a cam used in the engine.

By memorizing, in advance, the valve opening and closing timings expressed in crank angles, in the ROM, the CPU can easily obtain the pressure values P6 and P7 by taking in the pressure signal in each cylinder at each of the memorized crank angles corresponding to the timings, and can calculate the intake air amount in each cylinder, in real time.

As the injected fuel amount Gf in Equation (1), at the engine starting time, the data stored in advance in the controller 15 can be used.

Figure 12:
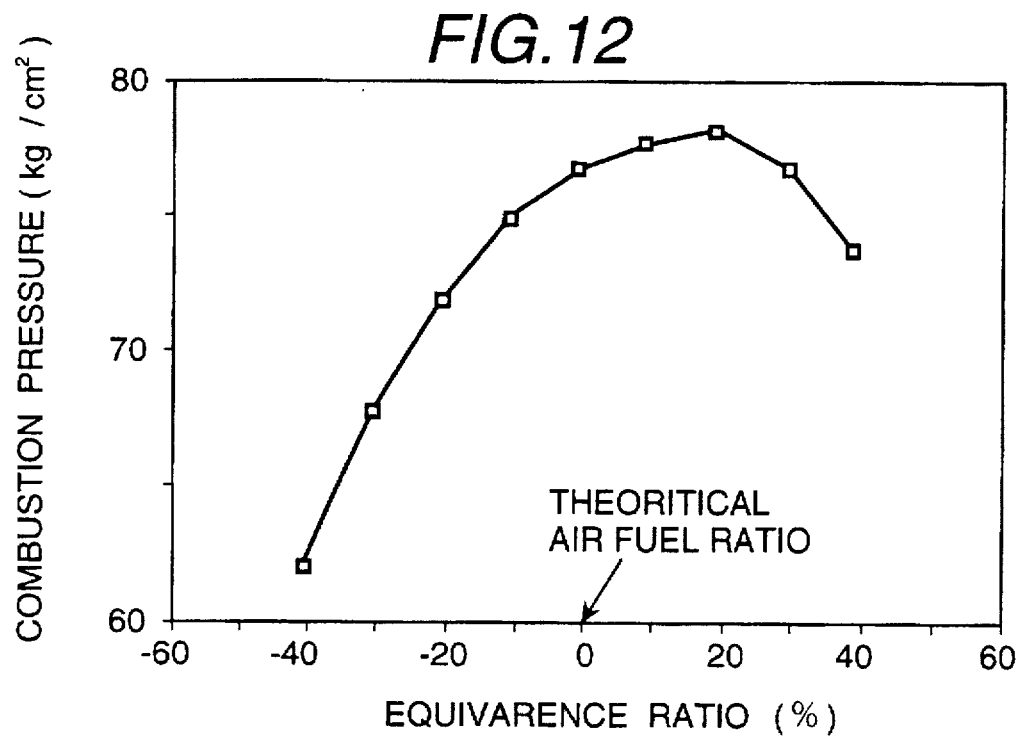
FIG. 12 is a characteristic curve showing the relationship between an air fuel ratio and the combustion peak pressure.

In FIG. 12, the relationship between the combustion peak pressure and the air fuel ratio of a gasoline engine is shown in the range of ±40% before and after the theoretical value (=14.7 stoichiometric valve) of the air fuel ratio. As shown in FIG. 12, changes in the combustion peak pressure with respect to changes of the air fuel ratio show a conic shaped waveform, the peak of which appears at a point slightly shifted from the theoretical air fuel ratio. It is known that the shift is caused by the thermal dissociation of fuel.

Figure 13:
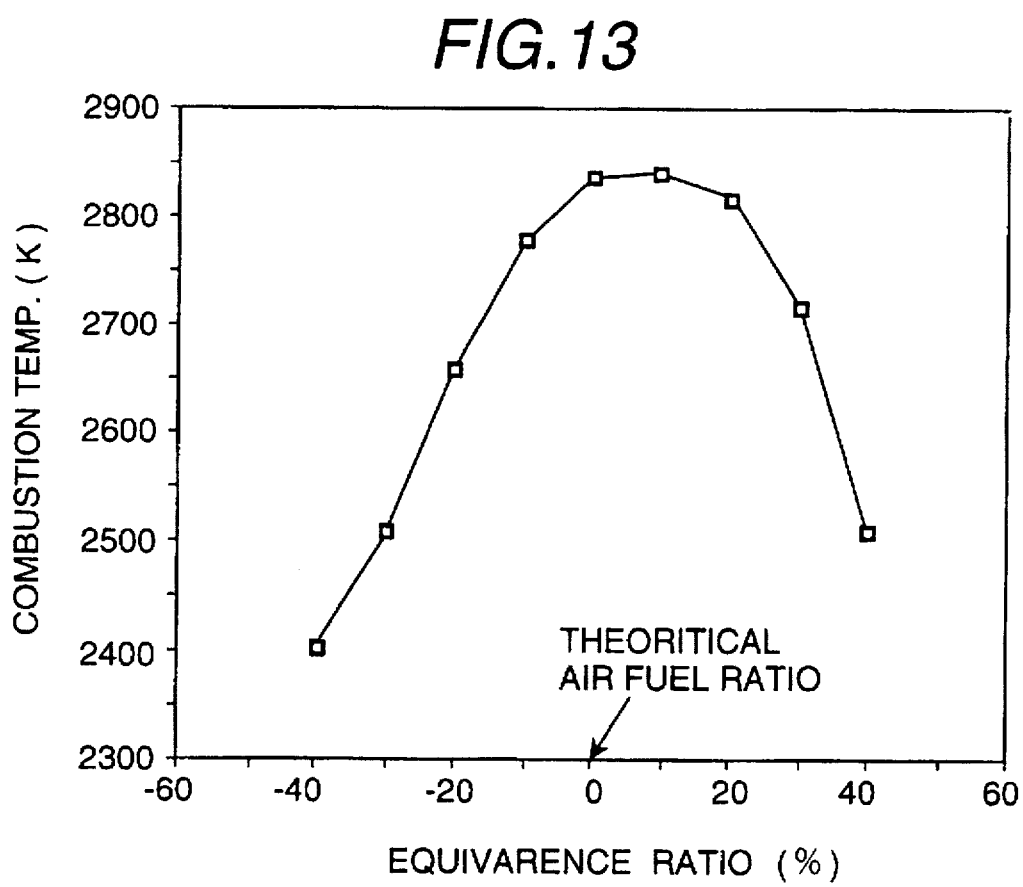
FIG. 13 is a characteristic curve showing the relationship between the air fuel ratio and combustion temperature.

Further, in FIG. 13, the relationship between the combustion temperature and the air fuel ratio of a gasoline engine is shown in the range of ±40% before and after the theoretical value of the air fuel ratio. Hence, changes of the temperature also shows a conic shaped waveform.

Among pressure P, volume V and temperature T, of gas, the relation PV=v RT (Boyle-Charles law, where v: molar number, and R: the gas constant) holds. By using the above-mentioned relations, and the relations shown in FIG. 12 and FIG. 13, the relationship between the combustion peak pressure and the fuel amount in a cylinder, is also known. Therefore, in the present invention, an engine combustion control for suppressing exhaustion of nitrogen oxide $NO_x$, can also be realized.

That is, in an embodiment realizing such an engine combustion control, the temperature, namely, the pressure, causing the thermal dissociation, is stored in the ROM of the controller 15. The pressure detected by the pressure sensor 8 in each cylinder is compared with the reference value of the pressure causing the thermal dissociation, stored in the ROM. If the detected pressure exceeds the reference value of the pressure causing the thermal dissociation, the controller 15 delays the ignition timing point, or changes the air fuel ratio, so that the combustion temperature is decreased, and consequently generation of nitrogen oxide $NO_x$, is reduced.

Further, the supervisory computing unit 17 sends a control signal to the EGR valve 24 via the EGR controlling circuit 20, such that the combustion temperature is decreased, and consequently the generation of nitrogen oxide is suppressed, by temporarily increasing the EGR amount corresponding to the present combustion temperature.

It is well-known that an EGR control was developed for suppressing the generation of nitrogen oxide in an engine. Nitrogen oxide is generated when nitrogen gas is thermally dissociated at the combustion temperature exceeding a threshold temperature, and it is experimentally known that the threshold temperature, namely, the temperature of the thermal dissociation, is about 1870 K.

In the existing EGR control, because the amount of EGR is empirically determined, it is not secured that the EGR control is accurately executed. Consequently, it is not also secured that the EGR is optimally controlled from the view points of both the engine performance and the cleaning-up of exhaust gas.

On the other hand, in the present invention, because the EGR control is executed, based on the combustion temperature calculated by using the pressure signal detected by the pressure sensor 12 in each cylinder, the certainly cleaned-up gas is always exhausted without degrading the operational performance of the engine.

Figure 14:
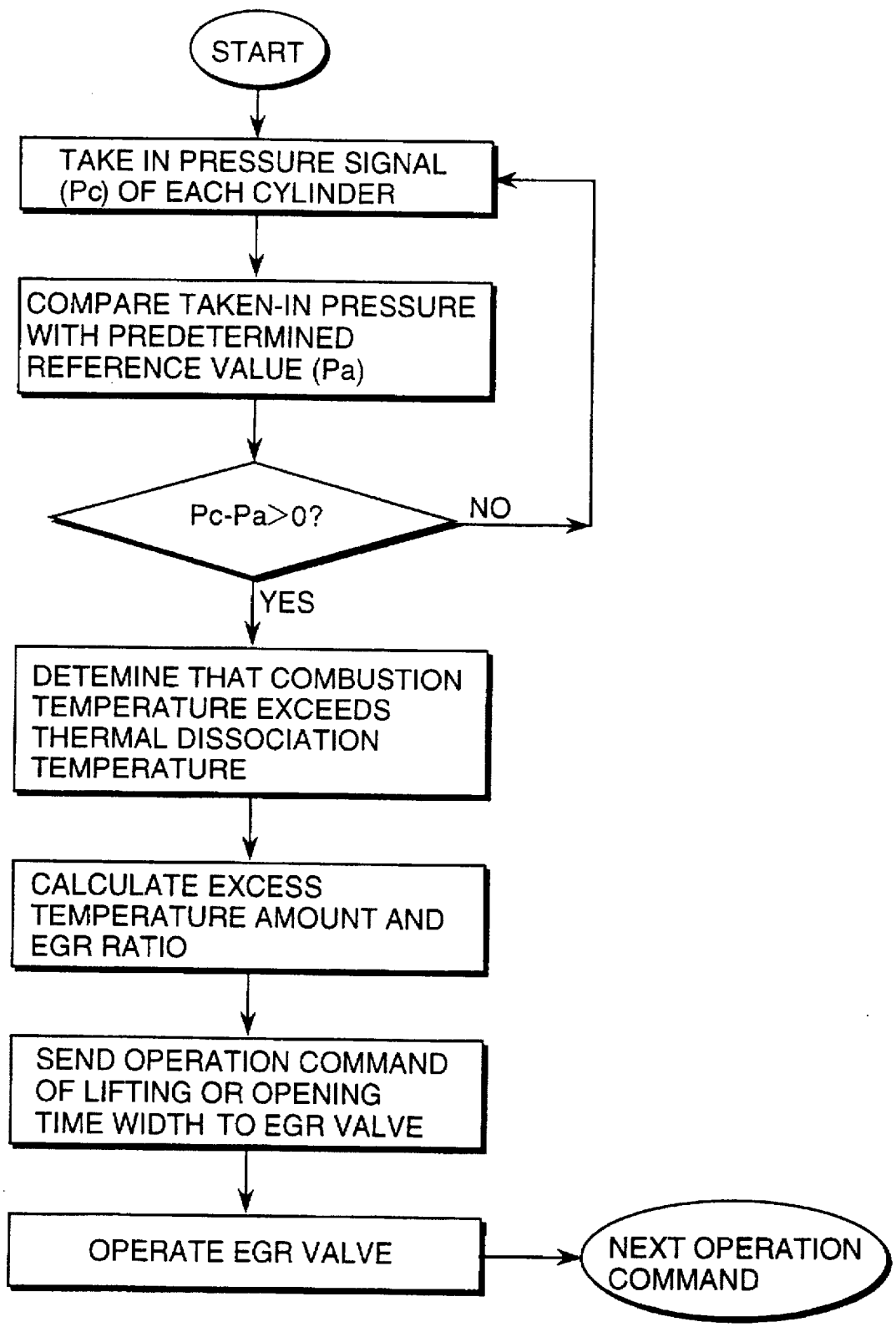
FIG. 14 is a flow chart for explaining control operations of an EGR unit, in the embodiment.

FIG. 14 is a flow chart for explaining the EGR control operations executed by the above-mentioned embodiment.

The control processing shown in FIG. 14 is also executed by the CPU of the supervisory computing unit 17 shown in FIG. 9, in which the program carrying out the processing is stored. At first, the signal Pc of pressure in each cylinder is taken in from the pressure sensor 8, and compared with the reference pressure Pa stored in the ROM, as mentioned above. Next, if Pc−Pa>0, it is judged that the combustion temperature exceeds the thermal dissociation temperature. Further, the necessary amount of EGR is calculated, corresponding to the excess temperature of the combustion temperature, from the thermal dissociation temperature, and the EGR valve 24 is controlled via the EGR controlling circuit 20 so that the calculated necessary amount of EGR is recirculated to the engine. On the other hand, if Pc−Pa≦0, that is, the combustion temperature is not more than the thermal dissociation temperature, then the EGR valve 24 is kept closed.

As mentioned above, because the existing EGR control is executed by using the recirculation ratio of exhaust gas, which is empirically predetermined, the existing control can not correspond to characteristic changes of the EGR valve 24, for example, caused by its deterioration with age.

On the contrary, in the embodiment of the present invention, because the EGR control is executed based on the always monitored combustion temperature directly relating to the exhaust amount of nitrogen oxide, the EGR control can compensate for the characteristic changes of the EGR valve 24, which realizes more accurate control of the EGR.

In the following, the arrangement of the pressure sensors 8 in the cylinders, is explained.

Figure 15A:
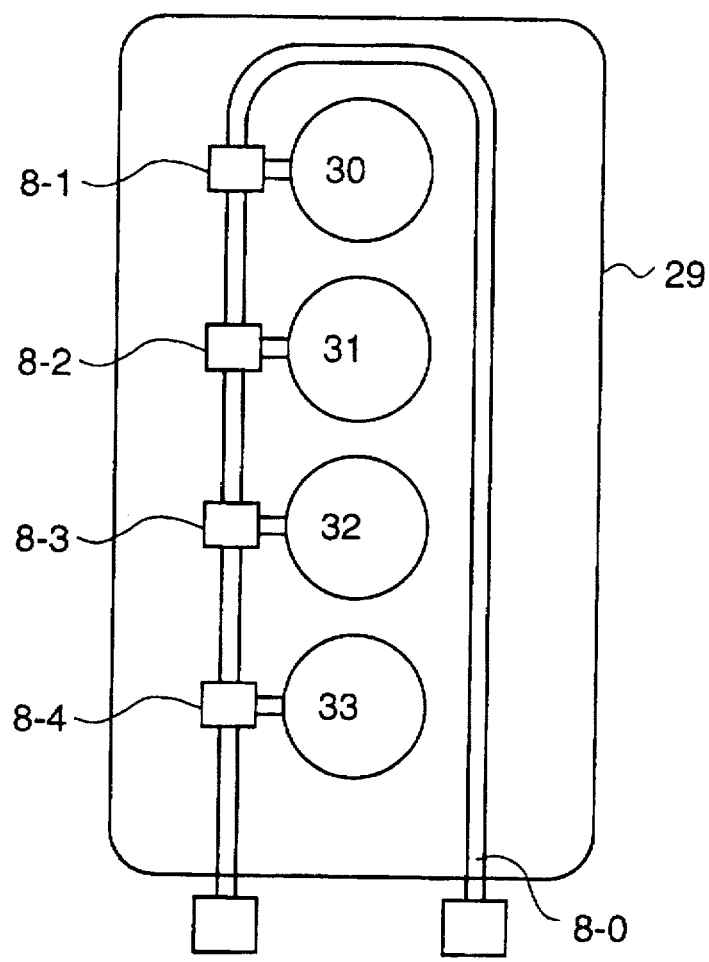
FIGS. 15A and 15B are illustrations for explaining the composition of pressure sensors provided at the cylinders of the embodiment.
Figure 15B:
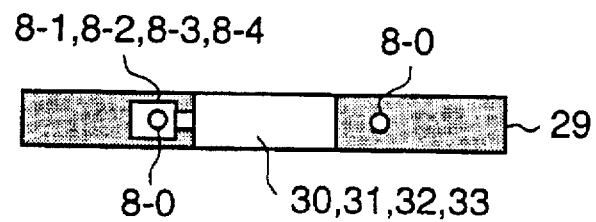

FIGS. 15A and 15B show an example of the arrangement of the pressure sensors 8 in the cylinders of the four cylinder engine, in a plan view and a cross-sectional elevation view of the arrangement of the pressure sensors, respectively. As shown in the figures, the pressure sensors 8 are buried and arranged in a gasket 29 inserted between a cylinder block and a cylinder head, and all signals from the pressure sensors 8 in the cylinders 3 are transmitted by one signal line 8-0. In the figures, numerals 30–34 indicate punched holes, and numerals 8-1–8-4 indicate pressure sensing elements.

As shown in the figures, each of the pressure sensing elements 8-1–8-4, is connected to a corresponding one of the punched holes 30–34 by a slender pipe open to each of the punched holes 30–34.

In the example of the arrangement of the pressure sensors, shown in FIGS. 15A and 15B, because the pressure sensing elements 8-1–8-4, are connected to one signal line 8-0, signals output from the pressure sensors of the cylinders are superimposed and detected, as shown in FIG. 16. Therefore, the pressure signals cannot be respectively separated as to the pressure signal detected in each cylinder. Especially, such a situation remarkably occurs in the intake stroke and the exhaust stroke because the level of each signal is low. However, the pressure peak value and the crank angle, corresponding to occurrence of the pressure peak value, can be detected with sufficient accuracy.

In the present invention, because it can be immediately determined whether the combustion state of the engine is at the continuously calculated target combustion state, by monitoring the combustion state in each cylinder with the pressure sensor introduced in each cylinder, the engine can certainly be controlled, based on results of the determined combustion state, so that the target combustion state is realized. This also improves the fuel consumption and the cleaning-up of the exhaust gas, without deteriorating the operational performance of the engine.

Furthermore, by applying the present invention, it can more easily be realized to provide an internal-combustion system sufficiently complying with the requirements, which will be strengthened more and more in the future, for preventing the global warming phenomenon, and delaying the fossil fuel exhaustion.

We claim:

1. An engine combustion control apparatus of an internal-combustion engine having plural cylinders, comprising:
   means for detecting the pressure in each of said cylinders, with respect to angle changes of a crank;
   means for storing said pressure in each of said cylinder;
   means for detecting speed of said engine;
   means for detecting pressure in an intake pipe for each of said cylinders;
   means for detecting oxygen density in an exhaust pipe for each of said cylinders; and
   a control unit which estimates an air fuel ratio, based on said detected oxygen density in said exhaust pipe, and controls factors, relating to engine combustion, of fuel amount to be injected, ignition timing and exhaust gas recirculation amount, based on operational states of each of said cylinders by using said pressure detected in said cylinder, said detected engine speed, said detected pressure in said intake pipe, and said estimated air fuel ratio, for each of said cylinders.

2. An engine combustion control apparatus according to claim 1, wherein said control unit further determines operational states of each of said cylinders, based on combustion peak pressure determined in said pressure detected in time-series, and controls said ignition timing so that said combustion peak pressure occurs in the angle range of a crank, of 10 deg.–15 deg. after the compression top dead center, at steady state operations of each of said cylinders.

3. An engine combustion control apparatus according to claim 1, wherein said control unit further identifies a cylinder operated in an intake stroke, and begins to feed fuel first to said identified cylinder, at the engine starting time.

4. An engine combustion control apparatus according to claim 1, wherein said control unit controls a fuel amount to be injected into each of said cylinders so that a combustion peak pressure value of said pressure detected in each of said cylinders, becomes as high as possible, by executing feedback control of said estimated air fuel ratio, based on a signal detected by said means for detecting oxygen density.

5. An engine combustion control apparatus according to claim 1, further including means for storing a relationship between combustion peak pressure and cylinder power of one state of said operational states, as a function expressing said relation, and means for correcting said detecting pressure means in each of said cylinders, by comparing a value of cylinder power obtained, based on said stored function, with a value of cylinder power estimated by using said pressure detected in said intake pipe and said detected speed of said engine, and adjusting said detecting pressure means in each of said cylinders so that both of said values agree.

6. An engine combustion control apparatus according to claim 1, further including means for storing data of said fuel amount to be injected into each of said cylinders, expressed by contours in an engine speed-combustion peak pressure plane.

7. An engine combustion control apparatus according to claim 1, wherein said controller does not start fuel injection until a crank shaft finishes a first revolution.

8. An engine combustion control apparatus according to claim 1, further including means for storing a relation between combustion peak pressure and combustion temperature, and the temperature of nitrogen gas dissociation; wherein said controller further estimates said combustion temperature in each of said cylinders by determining a peak pressure value, based on said detected pressure in said cylinder and said stored relation, and controls said exhaust gas recirculation amount so that said estimated combustion temperature does not exceed said stored temperature of nitrogen gas dissociation.

9. An engine combustion control apparatus of an internal-combustion engine having plural cylinders, comprising:
   a cylinder pressure detecting sensor providing a pressure signal with respect to angle changes of a crank in each of said cylinders;
   a memory which stores said pressure signal from said cylinder pressure detecting sensors;
   an engine speed sensor providing an engine speed output signal;
   an intake pipe pressure sensor provided in an intake pipe for each of said cylinders;
   an oxygen density sensor providing an oxygen density signal for an exhaust pipe for each of said cylinders; and
   a control unit receiving said oxygen density signal in order to estimate an air fuel ratio, said control unit controlling factors such as a fuel amount to be injected, an ignition timing and an exhaust gas recirculation amount relating to the engine combustion based on operational states of each of said cylinders by using said pressure signal, said engine speed signal, said intake pressure signal and said estimated air fuel ratio for each of said cylinders.

* * * * *

UNITED STATES PATENT AND TRADEMARK OFFICE
CERTIFICATE OF CORRECTION

PATENT NO. : 5,692,474
DATED      : December 2, 1997
INVENTOR(S) : Teruo YAMAUCHI et al.

It is certified that error appears in the above-indentified patent and that said Letters Patent is hereby corrected as shown below:

In Fig. 8, line 9 (third rectangular box), "CYLINDES" should be corrected to --CYLINDER--; and In Fig. 10A, "NOTORING OPERATION" should be corrected to --MOTORING OPERATION--.

Signed and Sealed this

Tenth Day of February, 1998

Attest:

BRUCE LEHMAN

Attesting Officer

Commissioner of Patents and Trademarks